July 14, 1931.   C. E. HARTMAN   1,814,034
WINDSHIELD PROTECTOR
Filed Jan. 15, 1929
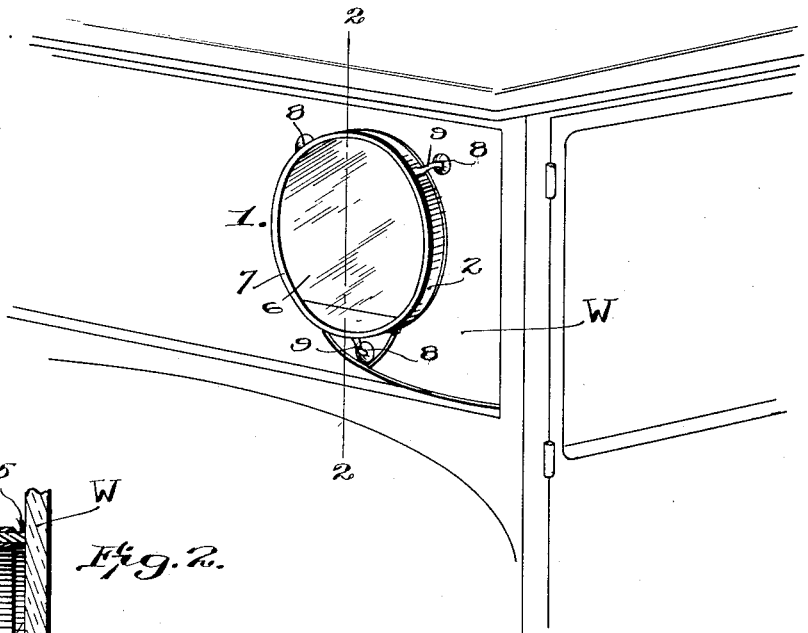
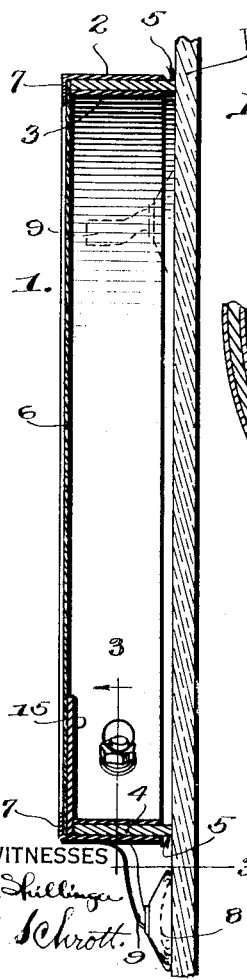
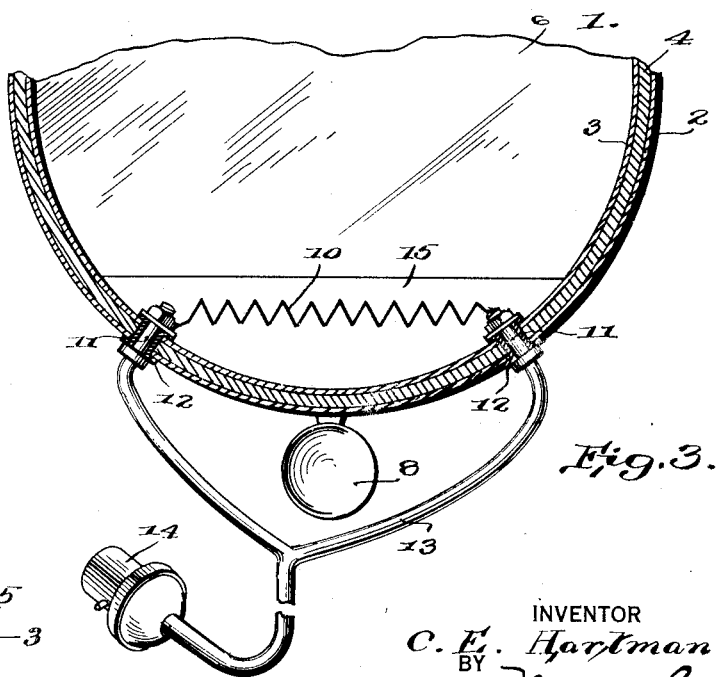
INVENTOR
C. E. Hartman
BY
ATTORNEY Patented July 14, 1931　　　　　　　　　　　　　　　　　　1,814,034

UNITED STATES PATENT OFFICE

CLIVE E. HARTMAN, OF ALLIANCE, NEBRASKA

WINDSHIELD PROTECTOR

Application filed January 15, 1929. Serial No. 332,575.

This invention relates to improvements in automobile windshield appliances, a particular purpose being to provide an appliance for protecting the windshield against frost on the inside and sleet on the outside so that the motorist will always have a spot of clear vision during adverse driving conditions in cold weather.

An object of the invention is to provide a glazed casing which is attachable to the outside of a windshield preferably by means of vacuum cups, this casing defining a dead air space adjacent to which no frost will form on the inside of the windshield, there being a heating element in the casing which can be energized to heat the air and in turn the glass or other transparency of the casing to prevent the formation of sleet.

Other objects and advantages appear in the following specification, reference being had to the accompanying drawings in which Figure 1 is a perspective view of the improved protector, showing it applied to the outside of a windshield, Figure 2 is a vertical section taken on the line 2—2 of Figure 1, Figure 3 is a detail cross section taken on the line 3—3 of Figure 2, the lower vacuum cup being shown in elevation.

As has been indicated already by the foregoing brief statements of the objects of the invention, it is the fundamental purpose thereof to facilitate the driving of an automobile in cold weather, particularly when conditions are such that frost is likely to form on the inside, or sleet will form on the outside. Under such conditions it is impossible to drive the automobile with any degree of safety without imposing on the driver the necessity of continually looking out around the adjacent side edge of the windshield.

It is not necessary to enlarge upon the dis comfort which the driver and other occu pants of the automobile must then endure, especially if the automobile is of the closed type, it being regarded as sufficient to say that the device herein described affords a remedy by providing a clear spot through which the driver can see, and by virtue of which he and the passengers will be spared the discomfort mentioned.

Reference is made to the drawings. The windshield is indicated W. The protector is generally designated 1. It comprises a casing which is composed of outer and inner bands 2 and 3 of metal or other light material. These bands are concentric. The first is larger than the second, thus defining an annular space in which a liner 4 of felt cloth, cork or other suitable material is fitted.

By preference the liner will protrude at 5 a slight distance beyond one edge of the bands 2 and 3, namely that edge which will come next to the windshield, so that the protruding edge can be pressed against the windshield both to form a seal and protect the windshield against scratching. This seal contributes toward defining a dead air space within the casing.

A pane of celluloid, glass or other transparent material 6 is fitted across the front of the casing. The pane can be held in place in any suitable manner, a suggested mode being to provide the band 2 with an inturned flange 7 which will press against the rim of the pane and not only hold the latter in place but also constitute the second seal which will make the foregoing air space perfectly tight.

A plurality of rubber vacuum cups 8 will hold the casing in place on the outside of the windshield. These are carried by brackets 9 protruding from the outer band 2. It is optional how many vacuum cups shall be employed. Three will ordinarily be sufficient. By slightly wetting these cups and pressing them against the windshield in a characteristic manner, a firm hold will be established and by virtue of the fact that the vacuum cups are supported on the outside of the casing it follows that each will be easily accessible for individual pressure for a firm seating thereof.

A heating element 10 has connection at its ends with binding posts or terminals 11. These are insulated at 12 from the casing. They are connectible with a source of current by an electric cord 13 and plug 14. The element 10 is located inside of the casing near the bottom, and in instances where the pane 6 is composed of celluloid a patch 15 of asbestos will be cemented or otherwise applied to the side of the pane next to the element in order to protect the element from excessive heat. The patch, usually being of asbestos, does not possess sufficient strength to insure its erect position, so rather than to rely on cement to hold it the lower part of the rim of the patch is clamped by the flange 7 against the edges of the inner band 3 and liner 4 to support the patch in front of the element 10.

It is to be noted that the circular shape of the casing shown is not to be regarded as a limitation. In practice it can be made oval, square, rectangular, triangular or in other shapes. This would largely be a matter of design. The purpose of the invention can be adequately carried out regardless of the shape of the casing.

The operation is readily understood. The user has only to slightly wet the vacuum cups 8 and press them against the windshield W when the protector 1 will be firmly held in position. The dead air space within the casing will prevent the formation of frost on the inside of the windshield in cold weather without the use of electric current, that is to say without energizing the element 10. The dead air space defines a relatively warm spot behind which frost will not form and which will thus afford the driver a place of unobstructed vision.

During periods when sleet tends to becloud the outside of the windshield or snow tends to collect thereon, the electric current will be turned on to energize the element 10. The air within the casing will be heated, and the pane 6 will not collect sleet, etc. by virtue of being warmed. The warmth may also extend to adjacent parts of the windshield W, the ultimate result being to provide a clear spot through which the driver can see. Although the drawing illustrates the protector installed on the outside of the windshield, it is to be understood that it may be used either inside or outside.

While the construction and arrangement of the improved windshield protector is that of a generally preferred form, obviously modifications and changes may be made without departing from the spirit of the invention or the scope of the claim.

I claim:—

A windshield protector comprising a glazed casing consisting of a pair of bands having a liner clamped therebetween and protruding at one edge of the casing, a heating element situated in the bands and liner and a pair of terminals insulated from and transfixing the casing both to support said element and hold the bands and liner together.

Signed at Chadron, in the county of Dawes and State of Nebraska, this 12th day of January A. D. 1929.

CLIVE E. HARTMAN.